(No Model.)
J. BUATIER.
THEATRICAL ILLUSION.
No. 462,391. Patented Nov. 3, 1891.
Fig. 1.
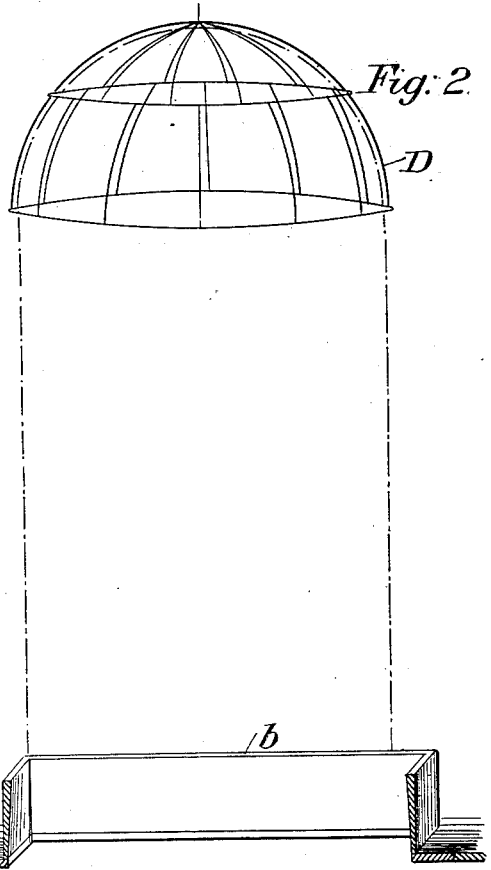
Fig. 2.
Fig. 3.
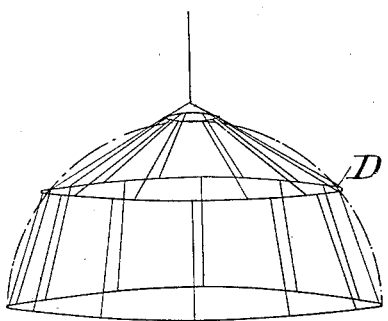
Fig. 4.
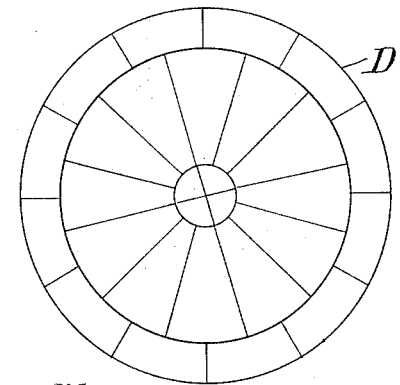
Witnesses:
George Barry
D. N. Hayworth
Inventor.
Joseph Buatier
by attorneys
Brown & Seward

UNITED STATES PATENT OFFICE.

JOSEPH BUATIER, OF PARIS, FRANCE.

THEATRICAL ILLUSION.

SPECIFICATION forming part of Letters Patent No. 462,391, dated November 3, 1891.

Application filed May 15, 1891. Serial No. 392,805. (No model.)

*To all whom it may concern:*

Be it known that I, JOSEPH BUATIER, of 85 Rue de Pompe, Passy, Paris, in the Republic of France, have invented certain new and useful Improvements in Connection with a Theatrical Illusion, of which the following is a specification.

The present invention relates to a theatrical illusion wherein special means are used by the operator for causing the disappearance of a cage and a person placed therein without the public being able to detect how the disappearance is effected.

In the accompanying drawings I have illustrated the illusion and the apparatus employed therein.

Figure 1 shows in elevation the person in position within a cage before the disappearance. Fig. 2 shows what remains of the apparatus after the disappearance, and Figs. 3 and 4 are side and plan views of a collapsible frame used in carrying out the trick.

A is a cage, and B is a wooden stool, which seems perfectly solid, but which in reality is composed of two parts, as hereinafter described. The operator having shown the stool to the spectators places it on a given place on the stage, stands the cage on it, and the person who is to disappear is made to enter the cage. (See Fig. 1.) The cage is then surrounded by a large veil, (not shown in the drawings,) and shortly afterward, when the veil is taken away, the cage and its contents have disappeared.

The following is a description of the means employed to produce this illusion: The stool B, which the operator has shown to the spectators, and which they suppose to consist of a single piece, is in reality composed of an exceedingly thin frame $b$, into which fits a block of wood $b'$, flush with the frame all round. The stool being thus in two pieces, it will be understood that if it be placed upon a trap, such as that shown at C in the drawings, of the exact dimensions of the internal block $b'$, the block and the cage placed upon it may be lowered, leaving the frame in place, which will still appear to the spectators as the complete stool.

In order that the stool thus constructed may be shown and touched by the public without their being able to see that it is in two parts, the inner walls of the frame $b$ are tapered in such a manner as to permit of the block $b'$ being retained therein by a wedge action.

In order that when the cage is covered by the veil its disappearance in the trap C may not be noticed by the displacement of the veil, I use a collapsible skeleton frame D, (see Figs. 3 and 4,) which covers the cage and takes the form of the upper part thereof. This frame, supported in the manner to be presently described, is suspended in the air under the veil while the cage descends through the trap. This skeleton frame D is made of very thin fine iron or steel wire, so as to be invisible to the public. It may be previously placed on the cage and brought on the stage at the same time, together with a metallic support, which serves to hold the frame, and which may disappear at the last moment. The skeleton frame may also be made of concentric circles of very fine steel wires connected one to the other by cotton thread. This frame, brought onto the stage at the same time as the cage, will be fixed to an invisible wire coming from the flies of the theater, or, if preferred, it may be supported by the hand of the operator. The whole being thus covered by the veil, when the cage is lowered on the trap the veil continues to hang on the frame, thereby concealing the descent of the cage. On removing the veil the operator will have to rapidly unhook the frame from the suspending wire, when such is used, and in unfolding the veil will let fall the frame onto the stage, where it will flatten out and thus be rendered invisible to the spectators.

Having now described my invention, what I claim is—

In a theatrical illusion, the combination of a cage and a body introduced thereinto, a veil for covering the said cage, a collapsible frame for the support of the veil, a block for the support of the cage, and a frame surrounding the said block, substantially as herein described.

JOSEPH BUATIER.

Witnesses:
H. K. WHITE,
A. W. SPACKMAN.